(12) United States Patent
Agarwal

(10) Patent No.: US 10,916,839 B2
(45) Date of Patent: Feb. 9, 2021

(54) ELECTRONIC EQUIPMENT

(71) Applicant: SONY CORPORATION, Tokyo (JP)

(72) Inventor: Chandrakant Agarwal, Tokyo (JP)

(73) Assignee: SONY CORPORATION, Tokyo (JP)

( * ) Notice: Subject to any disclaimer, the term of this patent is extended or adjusted under 35 U.S.C. 154(b) by 37 days.

(21) Appl. No.: 16/469,282

(22) PCT Filed: Oct. 17, 2017

(86) PCT No.: PCT/JP2017/037526
§ 371 (c)(1),
(2) Date: Jun. 13, 2019

(87) PCT Pub. No.: WO2018/116599
PCT Pub. Date: Jun. 28, 2018

(65) Prior Publication Data
US 2020/0006841 A1  Jan. 2, 2020

(30) Foreign Application Priority Data

Dec. 22, 2016  (JP) .................................. 2016-249774

(51) Int. Cl.
*H01Q 1/48* (2006.01)
*G03B 17/02* (2006.01)
*H01Q 1/24* (2006.01)

(52) U.S. Cl.
CPC ............... *H01Q 1/48* (2013.01); *G03B 17/02* (2013.01); *H01Q 1/24* (2013.01)

(58) Field of Classification Search
CPC ........... H01Q 1/24; H01Q 1/243; H01Q 1/44; H01Q 1/48; G03B 17/02
See application file for complete search history.

(56) References Cited

U.S. PATENT DOCUMENTS

2009/0231215 A1  9/2009  Taura
2013/0257659 A1  10/2013  Darnell et al.
(Continued)

FOREIGN PATENT DOCUMENTS

CN       103367864 A   10/2013
CN       105340126 A    2/2016
JP       2007-251570 A   9/2007
(Continued)

OTHER PUBLICATIONS

International Search Report and Written Opinion of PCT Application No. PCT/JP2017/037526, dated Jan. 9, 2018, 08 pages of ISRWO.

*Primary Examiner* — Robert Karacsony
(74) *Attorney, Agent, or Firm* — Chip Law Group

(57) ABSTRACT

Improved communication performance is achieved in the case where a metal housing section with an insulation-treated surface is also used as a radio wave emission section. Electronic equipment according to the present technology includes a metal housing section, an antenna board, and an electrical coupling section. The metal housing section has an insulation-treated surface and constitutes at least part of the housing. The antenna board is located inside the metal housing section and has electrical circuitry formed thereon for controlling supply of power to an antenna. The electrical coupling section has a metal plate in contact with the metal housing section and performs electrical coupling between the antenna board and the metal housing section through capacitive coupling via the metal plate.

11 Claims, 9 Drawing Sheets

(56) References Cited

U.S. PATENT DOCUMENTS

2014/0323063 A1 10/2014 Xu et al.
2014/0347225 A1 11/2014 Harper

FOREIGN PATENT DOCUMENTS

| JP | 2010-243634 A | 10/2010 |
| JP | 2015-126474 A | 7/2015 |
| KR | 10-2014-0139520 A | 12/2014 |
| KR | 10-2016-0013136 A | 2/2016 |
| TW | 201340629 A | 10/2013 |
| WO | 2007/058230 A1 | 5/2007 |

ELECTRONIC EQUIPMENT

CROSS REFERENCE TO RELATED APPLICATIONS

This application is a U.S. National Phase of International Patent Application No. PCT/JP2017/037526 filed on Oct. 17, 2017, which claims priority benefit of Japanese Patent Application No. JP 2016-249774 filed in the Japan Patent Office on Dec. 22, 2016. Each of the above-referenced applications is hereby incorporated herein by reference in its entirety.

TECHNICAL FIELD

The present technology relates to electronic equipment having wireless communication capability such as a digital camera apparatus and relates, more particularly, to a technical field of electronic equipment having, at least in part of a housing, a metal housing section with an insulation-treated surface.

BACKGROUND ART

PTL 1 described below discloses an imaging apparatus as a digital camera apparatus having wireless communication capability.

Also, PTL 2 described below discloses that at least part of a housing of an imaging apparatus includes, for example, a metal such as a magnesium alloy.

CITATION LIST

Patent Literature

[PTL 1]
   Japanese Patent Laid-open No. 2015-126474
[PTL 2]
   Japanese Patent Laid-open No. 2010-243634

SUMMARY

Technical Problem

Here, in the case where at least part of the housing of electronic equipment such as an imaging apparatus is configured as a metal housing section, one possibility would be to use the metal housing section also as a radio wave emission section for wireless communication such as an antenna ground or an antenna itself.

However, in the case where a metal is used for the housing of various pieces of electronic equipment such as an imaging apparatus, a surface of a metal portion is commonly chemical-conversion-coated as surface treatment, for example, for preservation or painting. For this reason, the problem to be solved is how to supply power to the metal portion.

The present technology has been devised in light of the foregoing circumstances, and it is an object of the present technology to achieve improved communication performance in the case where the metal housing section with an insulation-treated surface is also used as a radio wave emission section.

Solution to Problem

Electronic equipment according to the present technology includes a metal housing section that has an insulation-treated surface and constitutes at least part of a housing, an antenna board located inside the metal housing section and having electrical circuitry formed thereon for controlling supply of power to an antenna, and an electrical coupling section having a metal plate in contact with the metal housing section and performing electrical coupling between the antenna board and the metal housing section through capacitive coupling via the metal plate.

This allows for even an insulation-treated metal housing section to be electrically coupled with the antenna board through capacitive coupling. At this time, capacitive coupling is performed via a metal plate in contact with the metal housing section, thus making it easier to increase the coupling capacitance and provide improved communication performance for wireless communication using an antenna.

In the electronic equipment according to the present technology described above, it is preferable that the electrical coupling section should have a connection terminal for electrically connecting the antenna board and the metal plate, that the metal plate should be fixed to the metal housing section, and that the connection terminal should be fixed to the antenna board but not to the metal plate.

The fixing of the metal plate to the metal housing section and the fixing of the connection terminal to the antenna board but not to the metal plate eliminate the need to handle the antenna board with the metal plate fixed to the antenna board during assembly of the electronic equipment.

In the electronic equipment according to the present technology described above, it is preferable that the connection terminal should have a biasing force in a direction of approaching the metal plate.

This provides improved reliability in electrical connection between an antenna board side and a metal plate side.

In the electronic equipment according to the present technology described above, it is preferable that the electronic equipment should include an antenna electrically connected to the antenna board and that the electrical coupling section should perform grounding of the antenna through capacitive coupling via the metal plate.

This renders the metal housing section available for use as an antenna ground, thus providing a large ground.

In the electronic equipment according to the present technology described above, the electronic equipment is an imaging apparatus, and it is preferable that the metal housing section should have a grip frame section that constitutes an internal frame of a grip section having a shutter button and held by a user's hand and that the antenna board and the electrical coupling section should be located inside the grip frame section.

The grip frame section as described above has a relatively large inner space, thus giving a high degree of freedom in disposing the antenna board and the electrical coupling section.

In the electronic equipment according to the present technology described above, it is preferable that the grip frame section should be formed as a projecting portion having an edge on an imaging direction side protruding in the imaging direction and that the antenna board should be located inside the projecting portion of the grip frame section.

In an imaging apparatus, a main board having electrical circuitry for performing various types of image processing on captured images and controlling the equipment as a whole is commonly located near the edge on the side opposite to the imaging direction in the housing (because an imaging element is commonly located near the edge on the side opposite to the imaging direction in the housing).

Positioning the antenna board inside the projecting portion of the grip frame section that protrudes in the imaging direction as described above separates the antenna board from the main board at least in the direction parallel to the imaging direction.

The electronic equipment according to the present technology described above is an imaging apparatus, and it is preferable that the antenna should be located lower than an imaging optical axis.

This provides a reduced extent to which radio waves emitted from the antenna in directions parallel to or below a horizontal direction are reflected by a lens barrel (metal barrel).

In the electronic equipment according to the present technology described above, it is preferable that a connection terminal of the antenna board for performing electrical connection with the antenna should be located lower than the connection terminal for performing electrical connection with the metal plate.

This makes it possible to reduce a length of a power supply wire from the antenna board to the antenna in the case where the power supply wire is routed downward.

In the electronic equipment according to the present technology described above, it is preferable that an opening portion that allows communication between inner and outer spaces of the metal housing section should be formed in the metal housing section and that the antenna should be disposed at a position where the antenna covers the opening portion from outside the metal housing section.

As a result, a portion is provided behind the antenna where no metal housing section is formed, thus contributing to reduced electrical impact on the antenna from the metal housing section (antenna ground).

In the electronic equipment according to the present technology described above, it is preferable that the antenna should be attached to an insulating member that covers the opening portion from outside the metal housing section and that is supported by the metal housing section.

This prevents direct contact between the antenna and the metal housing section when the antenna is fastened to a position where the antenna covers the opening portion from outside the metal housing section.

In the electronic equipment according to the present technology described above, it is preferable that the antenna board should have a protruding connection terminal section protruding in the direction along a board thickness and that power should be supplied to the antenna via the protruding connection terminal section.

This makes it easier to dispose the antenna in a position where the antenna is not covered with the metal housing section irrespective of where the antenna board is disposed inside the metal housing section.

Advantageous Effects of Invention

According to the present technology, it is possible to achieve improved communication performance in the case where a metal housing section with an insulation-treated surface is used also as a radio wave emission section.

It should be noted that the effects described herein are not necessarily limited and may be any of the effects described in this disclosure.

DESCRIPTION OF EMBODIMENT

Description will be given below of an embodiment according to the present technology with reference to the attached drawings in the following order:
<1. Configuration of the Electronic Equipment>
<2. Summary of the Embodiment>
<3. Present Technology>

1. Configuration of the Electronic Equipment

Figure 1:
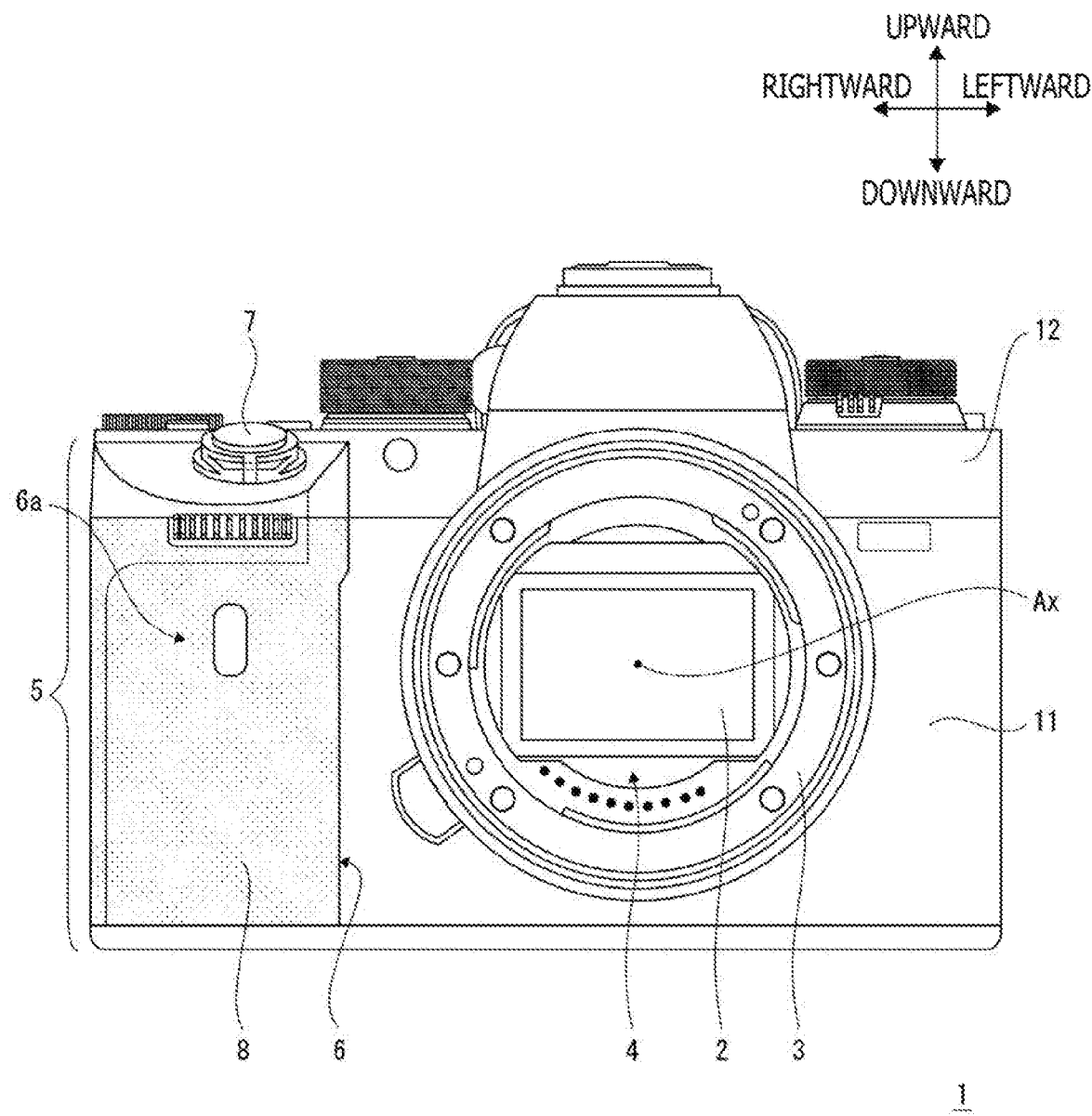
FIG. 1 is a front view of electronic equipment as an embodiment according to the present technology.
Figure 2:
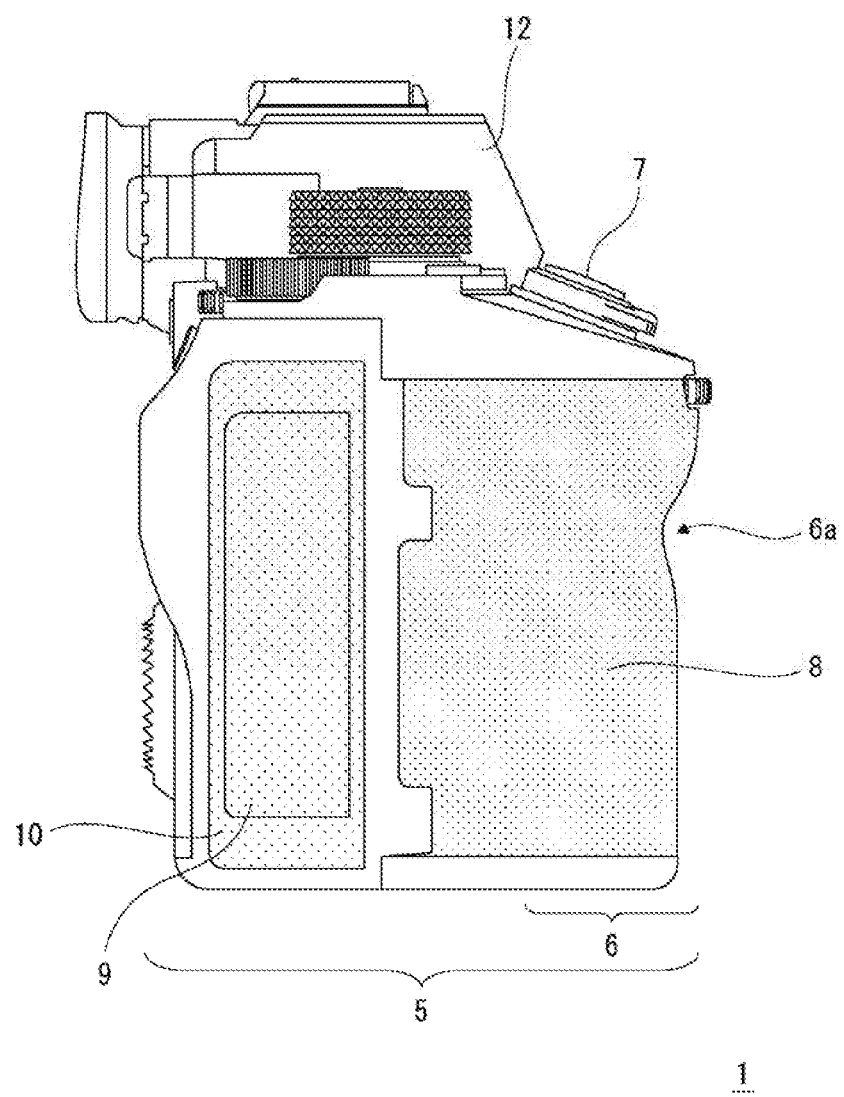
FIG. 2 is a right-side view of the electronic equipment as an embodiment according to the present technology.

FIGS. 1 and 2 are diagrams for describing an external appearance configuration of electronic equipment 1 as an embodiment which is, for example, an imaging apparatus as a digital camera apparatus, and FIGS. 1 and 2 are front and right-side views of the electronic equipment 1, respectively.

Here, forward and backward, upward and downward, and leftward and rightward directions of the imaging apparatus are defined as follows in the present description.

The forward direction is a direction that coincides with an imaging direction (direction parallel to the optical axis of an imaging lens and that of approaching a subject), and the backward direction is a direction opposite to the forward direction.

Each of the upward, downward, leftward, and rightward directions is determined relative to vertical and horizontal (horizontal line) directions in a captured image acquired by an imaging apparatus. Specifically, the upward, downward, leftward, and rightward directions represent those when the imaging apparatus has such a posture as to ensure that top and bottom directions and horizontal directions of the subject appearing in the captured image coincide with the vertical and horizontal directions of the captured image.

In the present example, each of the leftward and rightward directions is defined relative to a user's viewpoint. That is, the leftward and rightward directions respectively coincide with leftward and rightward directions when the imaging apparatus is seen from the back.

In FIG. 1, front and back directions relative to a plane of the figure coincide with the forward and backward directions, respectively, and upward and downward directions relative to the plane of the figure coincide with the upward and downward directions, respectively, and leftward and rightward directions relative to the plane of the figure coincide with the rightward and leftward directions, respectively.

The electronic equipment 1 of the present example is configured as an interchangeable lens mirrorless single lens reflex digital camera apparatus and incorporates an imaging element 2 that includes, for example, a CCD (Charge Coupled Devices) sensor, a CMOS (Complementary Metal-Oxide-Semiconductor) sensor, or other type of sensor.

A lens attachment section 3 is provided on the electronic equipment 1 to attach an interchangeable lens at an approximate center as seen from the front in an attachable/detachable manner. An approximately circular optical aperture 4 as seen from the front is formed on an inner circumference of the lens attachment section 3. The imaging element 2 is disposed behind the optical aperture 4 with an imaging surface facing forward.

Although an imaging optical axis Ax extending in a longitudinal direction via the optical aperture 4 is depicted by a black dot in FIG. 1, the center of the optical aperture 4 and the imaging element 2 approximately coincides with the imaging optical axis Ax.

The electronic equipment 1 of the present example is horizontally long in shape as seen from the front as an outer shape. Also, the electronic equipment 1 has a maximum longitudinal length shorter than the maximum horizontal length with an interchangeable lens not attached.

A right-side portion of the electronic equipment 1 is formed as a grip section 5 held by a user's hand. In the present example, the grip section 5 has a front edge protruding toward the forward side, and the protruding portion is formed as a protruding portion 6 (refer, in particular, to FIG. 2). The protruding portion 6 is a portion that protrudes forward the most in the electronic equipment 1.

The protruding portion 6 has a backward recess in a portion slightly higher than the vertical center of the front edge, and the portion having the recess is formed as a finger hooking section 6a (refer, in particular, to FIG. 2). The formation of the finger hooking section 6a provides greater ease with which the electronic equipment 1 can be held by a user.

A shutter button 7 is disposed above the grip section 5. Specifically, the shutter button 7 is located above the protruding portion 6.

Also, the grip section 5 has a rubber member (resin member) 8 that is exposed to an outside world as a partial surface member that includes at least the finger hooking section 6a of the protruding portion 6. The rubber member 8 has, on its surface, fine projections and recesses produced, for example, by surface texturing. This provides greater ease with which the electronic equipment 1 can be held by a user.

Further, the grip section 5 has an openable/closable lid section 9 at a portion more backward than the protruding portion 6 on a right-side surface (refer to FIG. 2). The lid section 9 of the present example has a vertically long rectangular shape as seen from the right of the electronic equipment 1. Various terminals such as a USB (Universal Serial Bus) terminal and HDMI (High Definition Multimedia Interface) terminal and an insertion section for inserting a given storage medium such as a memory card storage medium are disposed on the back side of the lid section 9 (center side of the electronic equipment 1). The user can cause these terminals and the insertion section to be exposed by opening the lid section 9.

It should be noted that projections and recesses are formed on the surface of the lid section 9 as on the rubber member 8. Also, the lid section 9 is surrounded by a rubber member 10 in the shape of a hollow rectangle on the right-side surface of the grip section 5.

Figure 3:
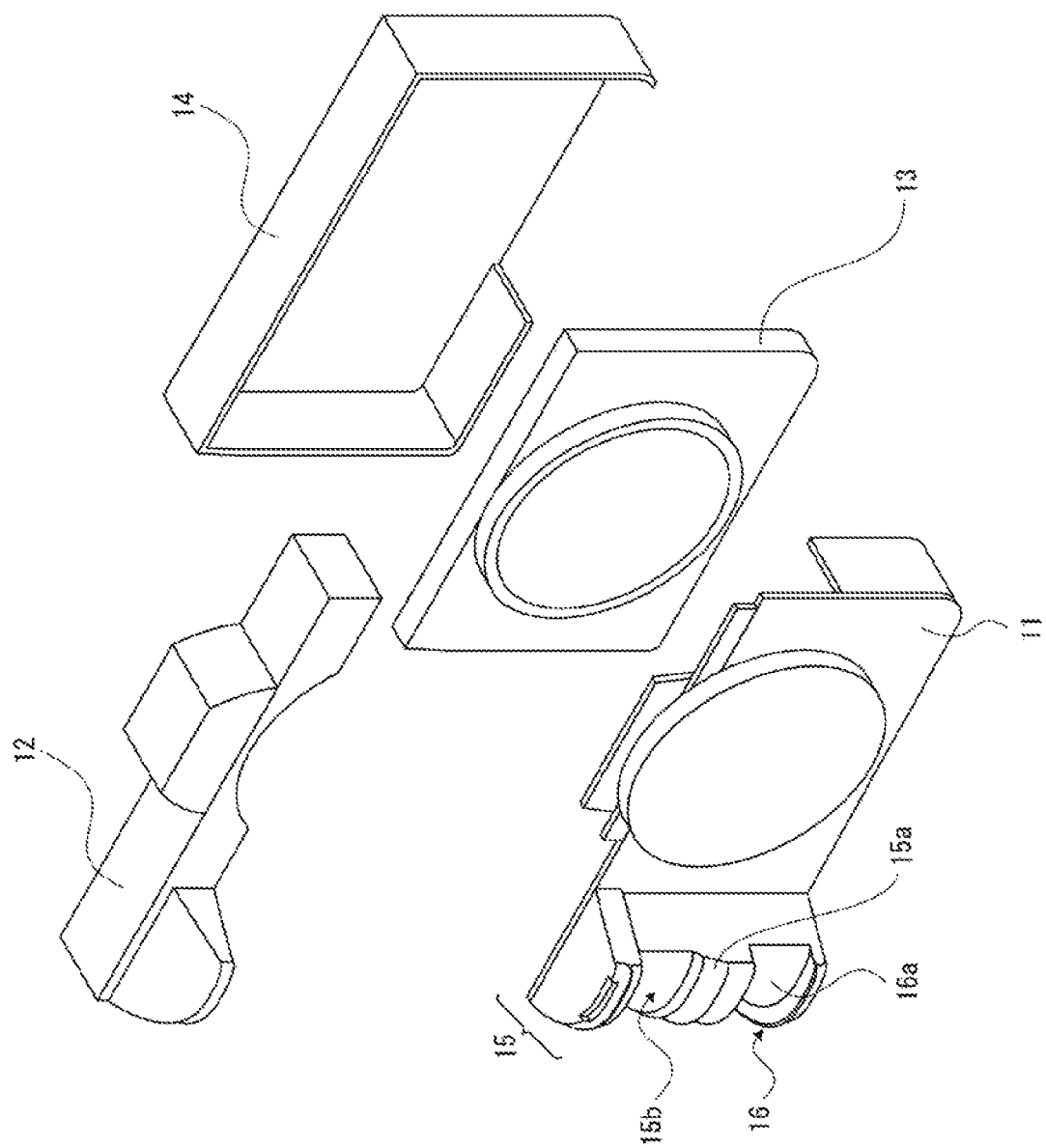
FIG. 3 is an explanatory diagram of a housing of the electronic equipment.

FIG. 3 is an explanatory diagram regarding the housing of the electronic equipment 1 and illustrates an exploded perspective view of a schematic configuration of a front metal housing section 11, an upper metal housing section 12, an inner metal housing section 13, and a back metal housing section 14 of the housing.

The housing of the electronic equipment 1 includes a combination of a plurality of metal housing sections as the front metal housing section 11, the upper metal housing section 12, the inner metal housing section 13, and the back metal housing section 14 assembled together. In the present example, these metal housing sections 11 to 14 include, for example, a magnesium alloy.

It should be noted that at least the front metal housing section 11 and the upper metal housing section 12 are at least partially exposed to the outside world in the electronic equipment 1 after assembly (refer to FIGS. 1 and 2).

Here, it is not essential that all the housing sections included in the housing of the electronic equipment 1 is made of metal, and some of the housing sections, for example, can include materials other than metals.

The front metal housing section 11, the upper metal housing section 12, the inner metal housing section 13, and the back metal housing section 14 are surface-treated such as through chemical-conversion coating, and the surfaces of the respective sections are insulation-treated.

A right-side portion of the front metal housing section 11 is formed as a grip frame section 15 constituting the internal frame of the grip section 5. As described earlier, the grip section 5 of the present example has the protruding portion 6 that protrudes toward the forward side. In keeping with this, therefore, the front edge of the grip frame section 15 protrudes forward, and the protruding portion is formed as a projecting portion 15a. Also, the grip frame section 15 has a backwardly recessed portion in the projecting portion 15a in keeping with the finger hooking section 6a described earlier, and the recessed portion is formed as a recessed portion 15b.

A notched portion 16 is formed in the projecting portion 15a at the lower portion of the front edge to dispose an insulating member 21 which will be described later. The notched portion 16 is formed as a backwardly recessed portion of part of the projecting portion 15a.

An opening portion 16a is formed in the notched portion 16 to allow communication between inner and outer spaces of the projecting portion 15a. In the present example, the opening surface of the opening portion 16a is approximately rectangular in shape.

Figure 4:
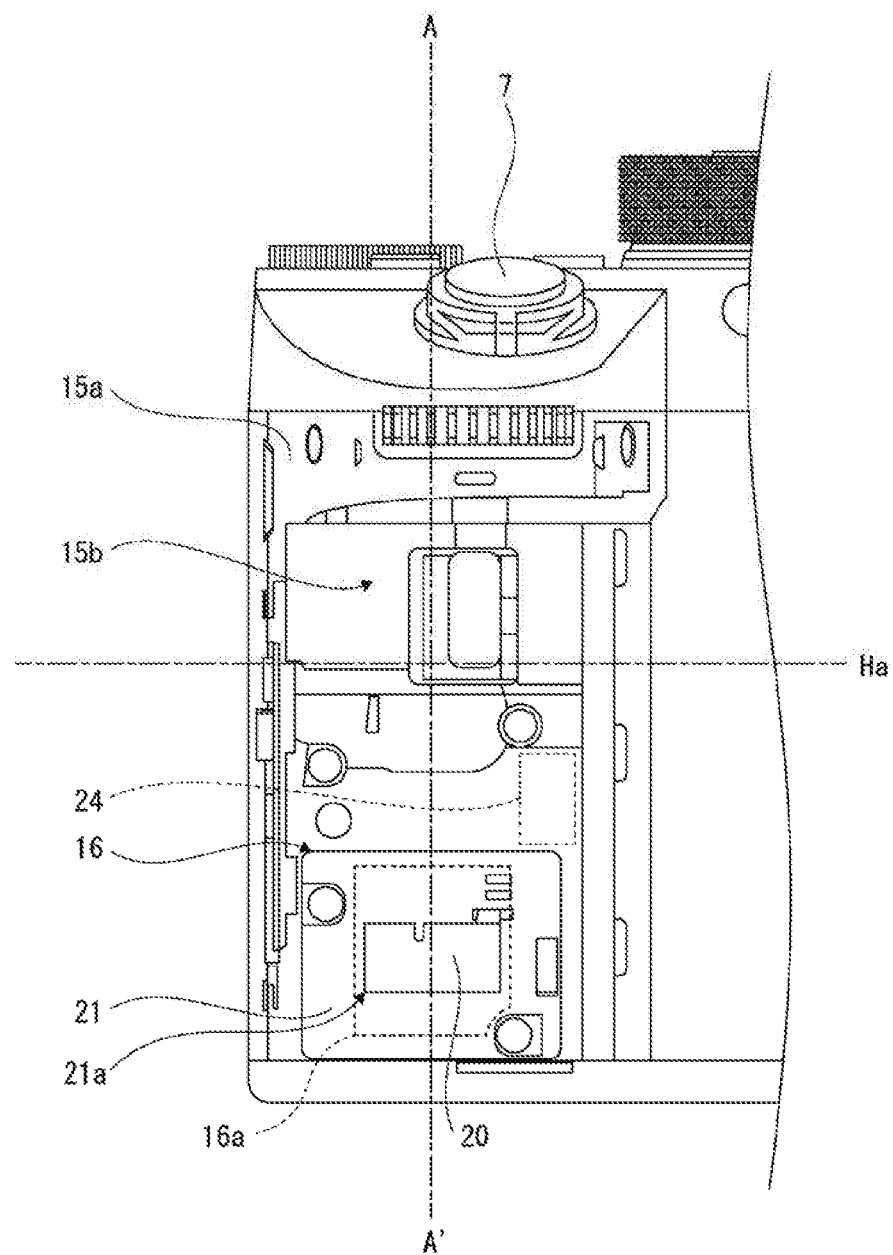
FIG. 4 is an enlarged front view of a grip section of the electronic equipment with a rubber member removed.
Figure 5:
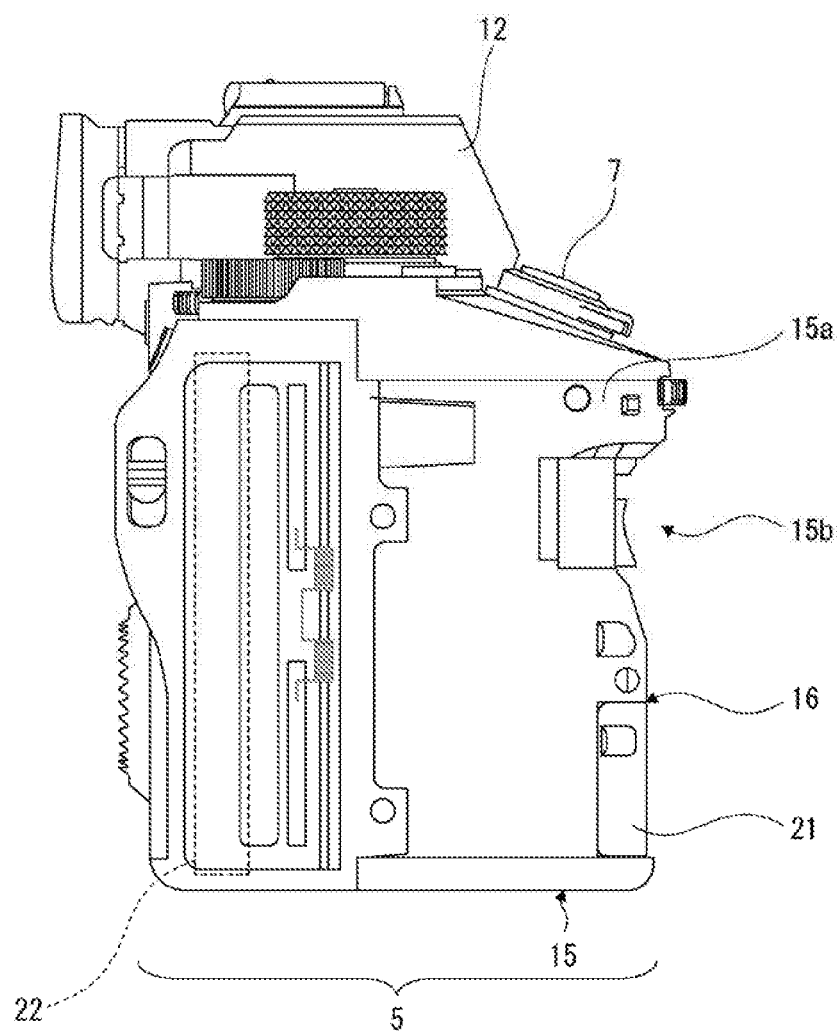
FIG. 5 is a right-side view of the grip section of the electronic equipment with the rubber member removed.

FIGS. 4 and 5 are diagrams for describing an external appearance configuration of the electronic equipment 1 with the rubber member 8 of the grip section 5 removed. FIG. 4 is an enlarged front view of the grip section 5, and FIG. 5 is a right-side view thereof. It should be noted that FIG. 5 illustrates a state where the lid section 9, the terminals and the insertion section disposed on the left of the lid section 9, and the rubber member 10 are removed.

In the electronic equipment 1 of the present example, an antenna 20 is provided at a lower portion (refer to FIG. 4) of the grip section 5 to perform wireless communication in accordance with a given communication standard with external equipment. The antenna 20 is, for example, a wireless communication antenna compliant with a wireless LAN (Local Area Network) communication standard.

In the present example, the antenna 20 is formed as a plate-shaped member and has an approximately rectangular shape that is horizontally long.

In the present example, the antenna 20 is attached to the insulating member 21 supported by the projecting portion 15a in the notched portion 16.

The insulating member 21 includes, for example, a resin member, and a recessed portion 21a (backwardly recessed portion) for attaching the antenna 20 at an approximately vertical and horizontal center of the front edge is formed. The antenna 20 is positioned and fitted into the recessed portion 21a for attachment to the insulating member 21.

The insulating member 21 is attached, in the notched portion 16, to the projecting portion 15a with the recessed portion 21a facing forward and the opening portion 16a covered from the front side. That is, the insulating member 21 is supported by the projecting portion 15a (front metal housing section 11). In the present example, the insulating member 21 is attached to the projecting portion 15a in an attachable/detachable manner such as screw clamping.

Although FIG. 4 illustrates the position of the opening portion 16a in the notched portion 16 by a dotted line, the antenna 20 attached to the insulating member 21 is disposed in a position where the antenna 20 covers the opening portion 16a from the front side.

This ensures that a portion where no metal housing section is formed is provided behind the antenna 20.

Signals to be sent via the antenna 20 are output from a main board 22 disposed inside the housing of the electronic equipment 1. FIG. 5 schematically illustrates the position of the main board 22 by a dotted line.

The main board 22 has electrical circuitry for performing various types of image processing on captured images and controlling the electronic equipment 1 as a whole. The electronic equipment 1 of the present example can generate still image files and video files based on captured images by using the electrical circuitry of the main board 22.

The main board 22 is disposed at a rear edge inside the housing of the electronic equipment 1 in an orientation in which the thickness direction approximately coincides with the longitudinal direction. In the present example, the main board 22 is horizontally long in shape as seen from the front, with a right-side edge located inside the grip section 5.

Figure 6:
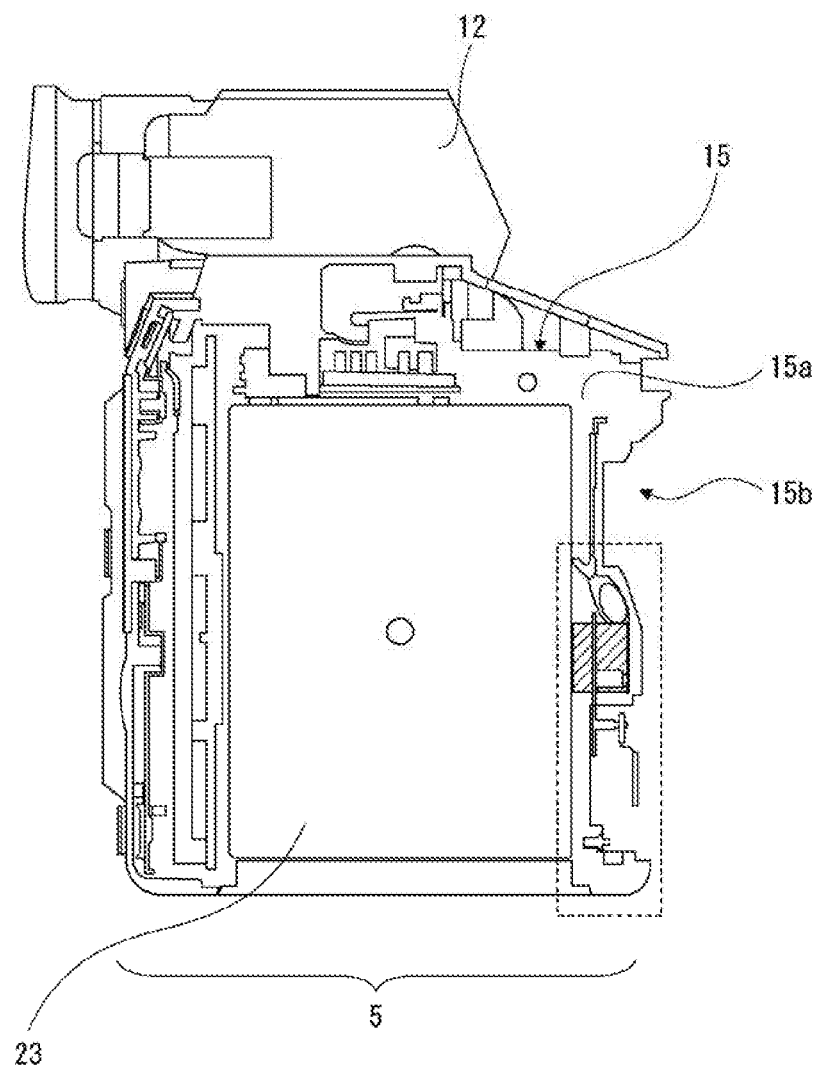
FIG. 6 is a right-side view of a cut model with a portion on the right of line A-A' depicted in FIG. 4 removed.

FIG. 6 illustrates, as a diagram for describing the configuration inside the grip section 5, a cut model of the electronic equipment 1 with a portion on the right of line A-A' depicted in FIG. 4 removed.

Figure 7:
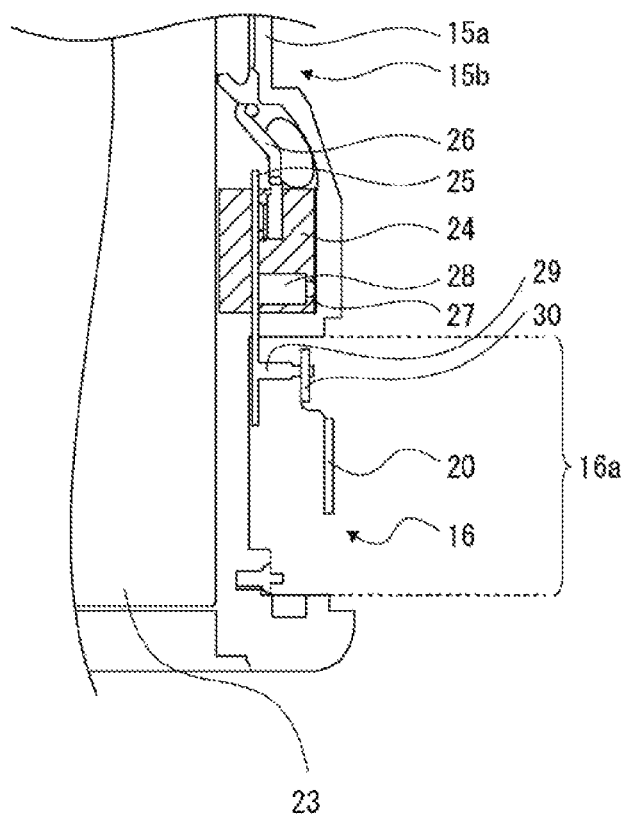
FIG. 7 is an enlarged view of the portion enclosed by a dotted line in FIG. 6.

FIG. 7 is an enlarged view of the portion enclosed by a dotted line in FIG. 6.

It should be noted that the rubber member 8 is removed in both FIGS. 6 and 7 and that, further, the insulating member 21 is not depicted for convenience of description.

A battery compartment case 23 (refer to FIG. 6) is disposed at an approximately longitudinal center inside the grip section 5. The battery compartment case 23 accommodates a battery such as a secondary battery that is an operation power source for the electronic equipment 1. The battery compartment case 23 is disposed such that at least part thereof is located inside the inner space of the grip frame section 15.

A metal plate 24 in a thin plate form (sheet form) is attached to the inner surface of the front edge of the projecting portion 15a. The metal plate 24 is, for example, a copper foil sheet and conductive. In the present example, the entire surface of the metal plate 24 is in contact with the inner surface of the projecting portion 15a (front metal housing section 11) and fixed thereto.

The metal plate 24 is vertically located between the recessed portion 15b and the notched portion 16. Although, in FIG. 4 described earlier, the position of the metal plate 24 is depicted by a dotted line, the metal plate 24 is horizontally located closer to the center of the electronic equipment 1 than the antenna 20 in the present example.

An antenna board 25 is disposed at a position inside the projecting portion 15a of the grip frame section 15 and more forward than the battery compartment case 23. The antenna board 25 is disposed in the orientation in which the thickness direction approximately coincides with the longitudinal direction and is vertically located such that only part of the lower portion thereof overlaps a region where the opening portion 16a is formed. The upper portion of the antenna board 25 is at least partially opposed to the metal plate 24.

The antenna board 25 has electrical circuitry formed thereon for controlling supply of power to the antenna, and a communication cable 26 is electrically connected to the antenna board 25 to exchange communication signals with the main board 22. In the present example, a coaxial cable is used as the communication cable 26.

A contact section 28 is provided on the antenna board 25. The contact section 28 has a ground connection terminal 27 for the above electrical circuit to perform ground connection of the antenna 20, and a tip of the ground connection terminal 27 (edge on the opposite side of the antenna board 24) is in contact with the metal plate 24. The contact section 28 is, for example, a connection terminal component called an on-board contact.

In the present example, the ground connection terminal 27 is, for example, a spring terminal and has a biasing force in the direction of approaching the metal plate 24. This provides improved reliability in electrical connection with the metal plate 24. Here, the ground connection terminal 27 is only in contact with the metal plate 24 but is not fixed thereto.

As described above, the ground connection terminal 27 is electrically connected to the metal plate 24 that is in contact with part of the front metal housing section 11 as the projecting portion 15a, thus grounding the antenna 20 to the front metal housing section 11 with an insulation-treated surface through capacitive coupling via the metal plate 24.

In order to realize capacitive coupling, a configuration can also be used in which the metal plate 24 is omitted, and instead, the ground connection terminal 27 is brought into contact with the front metal housing section 11. However, there is a possibility that this configuration may lead to insufficient coupling capacitance for achieving required wireless communication performance.

The provision of the metal plate 24 in contact with the front metal housing section 11 and the electrical connection of the ground connection terminal 27 to the metal plate 24 as described above allows to perform capacitive coupling between the metal plate 24 having a relatively large area and the front metal housing section 11, thus making it easy to increase the coupling capacitance and providing improved wireless communication performance using the antenna 20.

It should be noted that, in the present example, the metal plate 24 and the ground connection terminal 27 correspond to an "electrical coupling section" as recited in the claims.

To increase the coupling capacitance between the metal plate 24 and the front metal housing section 11, it is preferable that the area of the metal plate 24 should be increased. In the case of the present example, a contact surface between the metal plate 24 and the projecting portion 15a is approximately rectangular in shape and sized approximately 10.5 by 7 mm.

Here, one possibility would be to use a resin housing as a housing of the electronic equipment 1, and in that case, radio wave intensity can be improved by providing a ground of the antenna 20 with a metal member disposed inside the housing and enlarging the ground.

However, in the case where the housing is metalized, even if the ground inside the housing is enlarged, the housing functions as a shield, thus making it extremely difficult to improve radio wave intensity. For this reason, part of the metallic housing is also used as a ground in the present embodiment.

In FIG. 7, the antenna board 25 has a protruding connection terminal section 29 protruding in the thickness direction of the antenna board 25. The protruding connection terminal section 29 is provided in a position lower than the contact section 28. The protruding connection terminal section 29 is, for example, a connection terminal component called an on-board contact and has a connection terminal for electrically connecting the above electrical circuitry of the antenna board 25 and the antenna 20.

A relay section 30 having electrical wiring to the antenna 25 is located near the tip of the protruding connection terminal section 29, and the electrical wiring of the relay section 30 is electrically connected to the above connection terminal of the protruding connection terminal section 29. The relay section 30 has, for example, a flexible board, and the above electrical wiring formed on the flexible board is electrically connected to the antenna 25.

Figure 8:
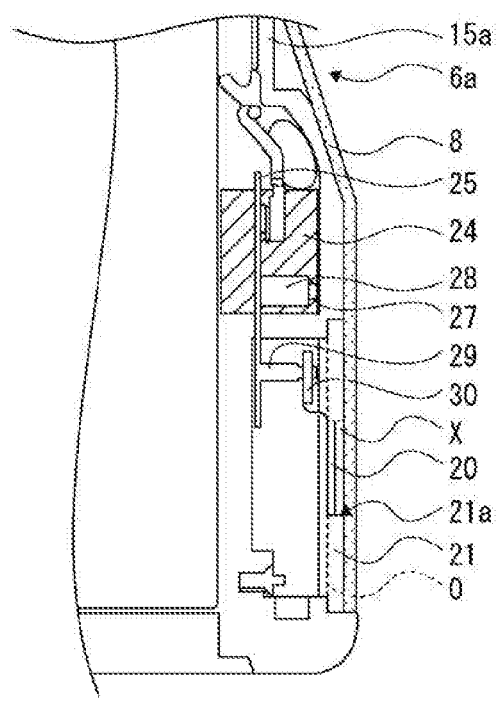
FIG. 8 is a diagram illustrating the cut model depicted in FIG. 7 with an insulating member and a rubber member attached.

FIG. 8 illustrates that the insulating member 21 and the rubber member 8 are attached in the enlarged view depicted in FIG. 7. It should be noted that FIG. 8 schematically illustrates an opening surface of the opening portion 16a by a vertical dotted line denoted as "0" in the figure.

The antenna 20 attached to the recessed portion 21a of the insulating member 21 is located longitudinally more forward than the opening surface of the opening portion 16a. That is, the antenna 20 is disposed in a position where the antenna 20 covers the opening portion 16a from the front.

The inner surface of the rubber member 8 is in contact with the front surface of the insulating member 21 to which the antenna 20 is attached.

At this time, a gap is formed between the front surface of the antenna 20 attached to the recessed portion 21a and the inner surface of the rubber member 8 as depicted by "X" in the figure. This gap can prevent the application of a pressure associated with holding by the user to the antenna 20, thus preventing damage or malfunction of the antenna 20.

Here, although the position of the imaging optical axis Ax in the height direction is depicted by a dot-dash line denoted as "Ha" in FIG. 4 described earlier, the antenna 20 is located lower than the imaging optical axis Ax in the electronic equipment 1 of the present example.

Figure 9A:
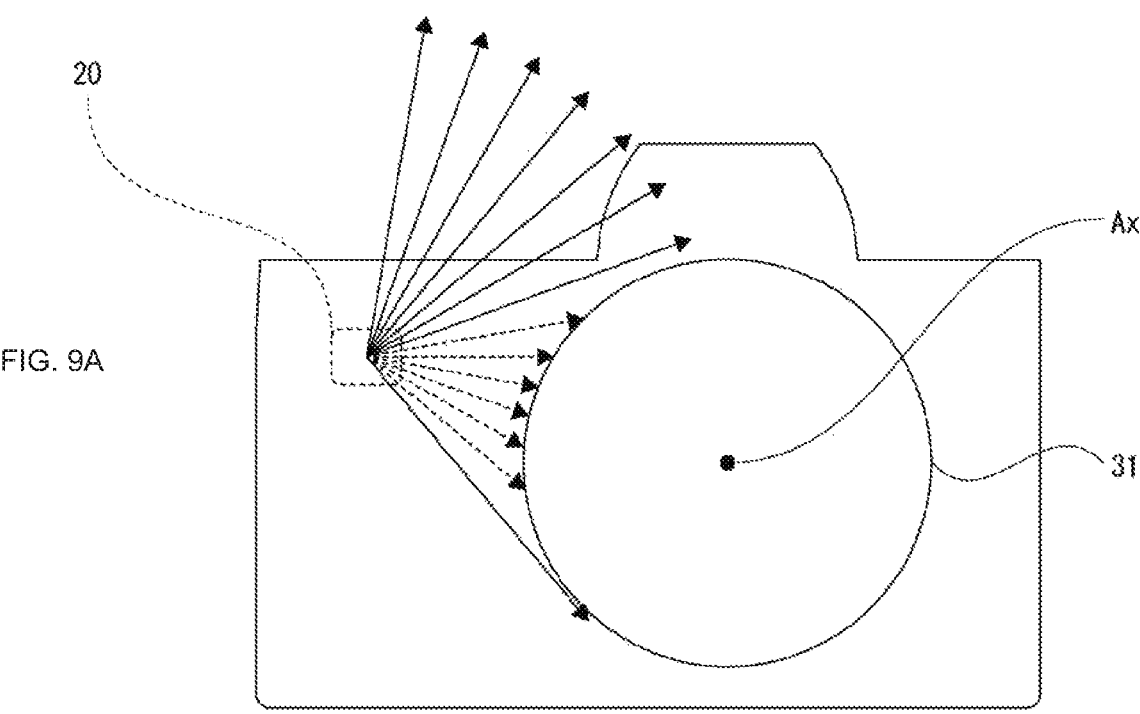
FIGS. 9A and 9B represents diagrams illustrating advantages associated with disposing an antenna lower than an imaging optical axis.

If the antenna 20 is located higher than the imaging optical axis Ax, radio waves emitted from the antenna 20 in the directions parallel to or below the horizontal direction (hereinafter denoted as "downward pointing radio waves") are reflected and, therefore, readily blocked by the lens barrel 31 (metal barrel) of an interchangeable lens attached to the lens attachment section 3, as illustrated in FIG. 9A.

Here, in the electronic equipment 1 as an imaging apparatus in particular, it is relatively rare that remote equipment for wireless communication via the antenna 20 is located higher than the electronic equipment 1. Also, downward pointing radio waves from the antenna 20 are reflected by a land surface, and the reflected waves can also be used for communication. Therefore, the amount of blocked downward pointing radio waves should be reduced to provide improved communication performance.

Figure 9B:
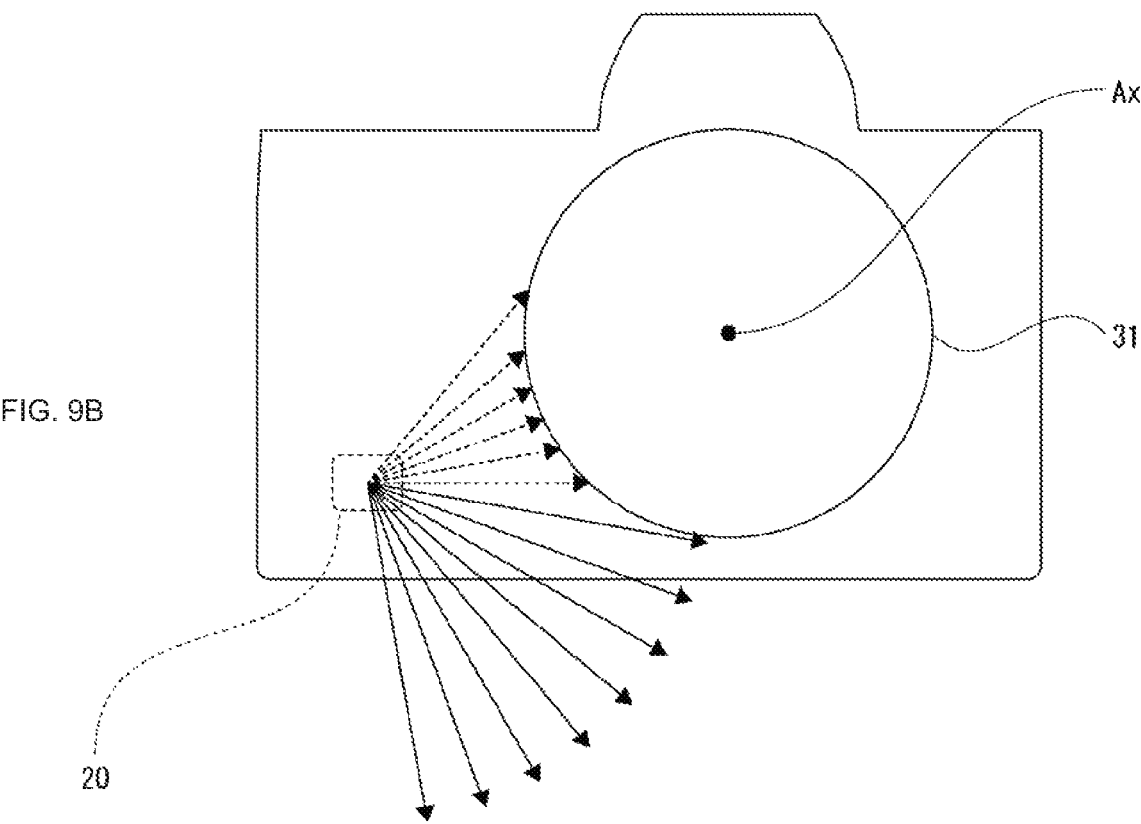

The positioning of the antenna 20 lower than the imaging optical axis Ax as in the present example contributes to a reduced extent to which downward pointing radio waves from the antenna 20 are blocked by the lens barrel 31 as illustrated in FIG. 9B, thus providing improved communication performance.

Also, in the electronic equipment 1 of the present example, the protruding connection terminal section 29 for electrical connection with the antenna 20 is located lower than the ground connection terminal 27 on the antenna board 25 (refer to FIG. 7).

This allows, in the case where a power supply wire from the antenna board 25 to the antenna 20 is routed downward (refer, in particular, to a wiring direction at the relay section 30 depicted in FIG. 7), the power supply wire can be reduced in length, thus making it less likely for external noise to be superimposed on input and output signals between the antenna board 25 and the antenna 20.

It should be noted that although a case has been described above in which the electronic equipment 1 is an imaging apparatus, the electronic equipment of the present technology is suitably applicable, for example, to information processing equipment such as a smartphone or a tablet terminal, various types of player equipment such as an audio player, various types of electronic equipment such as a wireless LAN router and a TV receiver.

Also, although a case has been described above in which an electrical coupling section is used for grounding of the antenna, in the case where at least part of a metal housing section of the electronic equipment (metal housing section with an insulation-treated surface) is used as an antenna, the electrical coupling section of the present technology can be used for electrical coupling between the metal portion as an antenna and an antenna board.

2. Summary of the Embodiment

As described above, the electronic equipment as an embodiment (the electronic equipment 1) includes a metal housing section (the front metal housing section 11), an antenna board (the antenna board 25), and an electrical coupling section (the metal plate 24 and the ground connection terminal 27). The metal housing section has an insulation-treated surface and constitutes at least part of the housing. The antenna board is located inside the metal housing section and has electrical circuitry formed thereon for controlling supply of power to an antenna. The electrical coupling section has a metal plate (the metal plate 24) in contact with the metal housing section and performs electrical coupling between the antenna board and the metal housing section through capacitive coupling via the metal plate.

This allows for even an insulation-treated metal housing section to be electrically coupled with the antenna board through capacitive coupling. At this time, capacitive coupling is performed via a metal plate in contact with the metal housing section, thus making it easier to increase the coupling capacitance and providing improved communication performance for wireless communication using an antenna.

As described above, the electronic equipment as an embodiment can contribute to improved communication performance in the case where the metal housing section with an insulation-treated surface is also used as a radio wave emission section.

Also, in the electronic equipment as an embodiment, the electrical coupling section has a connection terminal (the ground connection terminal 27) for electrically connecting the antenna board and the metal plate, and the metal plate is fixed to the metal housing section, and the connection terminal is fixed to the antenna board but not to the metal plate.

The fixing of the metal plate to the metal housing section and the fixing of the connection terminal to the antenna board but not to the metal plate eliminate the need to handle the antenna board with the metal plate fixed to the antenna board during assembly of the electronic equipment, thus making it easier to attach the antenna board and contributing to improved efficiency in assembly of the electronic equipment.

Further, in the electronic equipment as an embodiment, the connection terminal has a biasing force in the direction of approaching the metal plate.

This provides improved reliability in electrical connection between the antenna board side and the metal plate side, thus preventing aggravation of the communication performance caused by improper connection.

Further, the electronic equipment as an embodiment includes an antenna (the antenna 20) electrically connected to the antenna board, and the electrical coupling section performs grounding of the antenna through capacitive coupling via the metal plate.

This renders the metal housing section available for use as an antenna ground, thus providing a large ground.

Therefore, wireless communication performance via an antenna can be improved.

Also, the electronic equipment as an embodiment is electronic equipment as an imaging apparatus, and the metal housing section has a grip frame section (the grip frame section 15) that constitutes the internal frame of the grip section having the shutter button and held by the user's hand, and the antenna board and the electrical coupling section are located inside the grip frame section.

The grip frame section as described above has a relatively large inner space, thus giving a high degree of freedom in disposing the antenna board and the electrical coupling section.

This makes it possible to enhance the degree of freedom in equipment design including layout of the antenna board and the electrical coupling section.

Further, in the electronic equipment as an embodiment, the grip frame section is formed as a projecting portion (projecting portion 15a) having an edge on an imaging direction side (forward side) protruding in the imaging direction, and the antenna board is located inside the projecting portion of the grip frame section.

In the imaging apparatus, a main board having electrical circuitry for performing various types of image processing on captured images and controlling the equipment as a whole is commonly located near the edge on the side opposite to the imaging direction in the housing (because an imaging element is commonly located near the edge on the side opposite to the imaging direction in the housing). The antenna board is located inside the projecting portion of the grip frame section that protrudes in the imaging direction, thus separating the antenna board from the main board at least in the direction parallel to the imaging direction.

This suppresses noise from entering from the main board, thus providing improved wireless communication performance via an antenna.

Further, the electronic equipment as an embodiment is electronic equipment as an imaging apparatus, and the antenna is located lower than an imaging optical axis.

This provides a reduced extent to which radio waves emitted from the antenna in directions parallel to or below a horizontal direction are reflected by a lens barrel (metal barrel).

As a result, wireless communication performance can be improved.

Also, in the electronic equipment as an embodiment, a connection terminal (the protruding connection terminal section 29) of the antenna board for performing electrical connection with the antenna is located lower than the connection terminal (the ground connection terminal 27) for performing electrical connection with the metal plate.

This makes it possible to reduce a length of a power supply wire from the antenna board to the antenna in the case where the power supply wire is routed downward.

As a result, it is less likely for external noise to be superimposed on input and output signals between the antenna board and the antenna, thus providing improved communication performance.

Further, in the electronic equipment as an embodiment, an opening portion (the opening portion 16a) that allows communication between inner and outer spaces of the metal housing section is formed in the metal housing section, and the antenna is disposed at a position where the antenna covers the opening portion from outside the metal housing section.

As a result, a portion is provided behind the antenna where no metal housing section is formed, thus contributing to reduced electrical impact on the antenna from the metal housing section (antenna ground).

Therefore, communication performance can be improved.

Further, in the electronic equipment as an embodiment, the antenna is attached to an insulating member (the insulating member 21) that covers the opening portion from outside the metal housing section and that is supported by the metal housing section.

This prevents direct contact between the antenna and the metal housing section when the antenna is fastened to a position where the antenna covers the opening portion from outside the metal housing section.

Therefore, electrical impact on the antenna from the metal housing section is reduced, thus providing improved communication performance.

Also, in the electronic equipment as an embodiment, the antenna board has a protruding connection terminal section (the protruding connection terminal section 29) protruding in the direction along a board thickness, thus supplying power to the antenna via the protruding connection terminal section.

This makes it easier to dispose the antenna where the antenna is not covered with the metal housing section irrespective of where the antenna board is disposed inside the metal housing section.

Therefore, the degree of freedom can be enhanced in equipment design including layout of the antenna board.

It should be noted that the effects described in the present description are merely illustrative and are not limited and that there may be other effects.

3. Present Technology

It should be noted that the present technology can also have the following configurations:

(1)

Electronic equipment including:

a metal housing section that has an insulation-treated surface and constitutes at least part of a housing;

an antenna board located inside the metal housing section and having electrical circuitry formed thereon for controlling supply of power to an antenna; and an electrical coupling section having a metal plate in contact with the metal housing section and performing electrical coupling between the antenna board and the metal housing section through capacitive coupling via the metal plate.

(2)

The electronic equipment according to (1), in which electrical coupling section has a connection terminal for electrically connecting the antenna board and the metal plate, and the metal plate is fixed to the metal housing section, and the connection terminal is fixed to the antenna board but not to the metal plate.

(3)

The electronic equipment according to (2), in which the connection terminal has a biasing force in a direction of approaching the metal plate.

(4)

The electronic equipment according to any one of (1) to (3), including:

an antenna electrically connected to the antenna board, in which the electrical coupling section performs grounding of the antenna through capacitive coupling via the metal plate.

(5)

The electronic equipment according to any one of (1) to (4), being electronic equipment as an imaging apparatus, in which the metal housing section has a grip frame section that constitutes an internal frame of a grip section having a shutter button and held by a user's hand, and the antenna board and the electrical coupling section are located inside the grip frame section.

(6)

The electronic equipment according to (5), in which the grip frame section is formed as a projecting portion having an edge on an imaging direction side protruding in the imaging direction, and the antenna board is located inside the projecting portion of the grip frame section.

(7)

The electronic equipment according to (4), being electronic equipment as an imaging apparatus, in which the antenna is located lower than an imaging optical axis.

(8)

The electronic equipment according to (4) or (7), in which a connection terminal of the antenna board for performing electrical connection with the antenna is located lower than the connection terminal for performing electrical connection with the metal plate.

(9)

The electronic equipment according to (4), (7) or (8), in which an opening portion that allows communication between inner and outer spaces of the metal housing section is formed in the metal housing section, and the antenna is disposed at a position where the antenna covers the opening portion from outside the metal housing section.

(10)

The electronic equipment according to (9), in which the antenna is attached to an insulating member that covers the opening portion from outside the metal housing section and that is supported by the metal housing section.

(11)

The electronic equipment according to (4) or any one of (7) to (10), in which the antenna board has a protruding connection terminal section protruding in the direction along a board thickness, and power is supplied to the antenna via the protruding connection terminal section.

REFERENCE SIGNS LIST

1 Electronic equipment, 2 Imaging element, 3 Lens attachment section, 4 Optical aperture, 5 Grip section, 6 Protruding portion, 6a Finger hooking section, 7 Shutter button, 8 Rubber member, 11 Front metal housing section, 15 Grip frame section, 15a Projecting portion, 16 Notched portion, 16a Opening portion, 20 Antenna, 21 Insulating member, 22 Main board, 24 Metal plate, 25 Antenna board, 26 Communication cable, 27 Ground connection terminal, 28 Contact section, 29 Protruding connection terminal section

The invention claimed is:

1. Electronic equipment comprising:
   a metal housing section that has an insulation-treated surface and constitutes at least part of a housing;
   an antenna board located inside the metal housing section, wherein the antenna board has electrical circuitry formed thereon for controlling supply of power to an antenna; and
   an electrical coupling section having a metal plate in contact with the metal housing section, wherein the electrical coupling section performs electrical coupling between the antenna board and the metal housing section through capacitive coupling via the metal plate.

2. The electronic equipment according to claim 1, wherein
   the electrical coupling section has a connection terminal for electrically connecting the antenna board and the metal plate, and
   the metal plate is fixed to the metal housing section, and the connection terminal is fixed to the antenna board but not to the metal plate.

3. The electronic equipment according to claim 2, wherein
   the connection terminal has a biasing force in a direction of approaching the metal plate.

4. The electronic equipment according to claim 1, comprising the antenna electrically connected to the antenna board, wherein
   the electrical coupling section performs grounding of the antenna through the capacitive coupling via the metal plate.

5. The electronic equipment according to claim 1, wherein the electronic equipment is an imaging apparatus, wherein
   the metal housing section has a grip frame section that constitutes an internal frame of a grip section having a shutter button and held by a user's hand, and
   the antenna board and the electrical coupling section are located inside the grip frame section.

6. The electronic equipment according to claim 5, wherein
   the grip frame section is formed as a projecting portion having an edge on an imaging direction side protruding an the imaging direction, and
   the antenna board is located inside the projecting portion of the grip frame section.

7. The electronic equipment according to claim 4, wherein the electronic equipment is an imaging apparatus, wherein
   the antenna is located lower than an imaging optical axis.

8. The electronic equipment according to claim 4, wherein a connection terminal of the antenna board for performing electrical connection with the antenna is located lower than a connection terminal for performing electrical connection with the metal plate.

9. The electronic equipment according to claim 4, wherein an opening portion that allows communication between inner and outer spaces of the metal housing section is formed in the metal housing section, and the antenna is disposed at a position where the antenna covers the opening portion from outside the metal housing section.

10. The electronic equipment according to claim 9, wherein the antenna is attached to an insulating member that covers the opening portion from outside the metal housing section and that is supported by the metal housing section.

11. The electronic equipment according to claim 4, wherein the antenna board has a protruding connection terminal section protruding in a direction along a board thickness, and power is supplied to the antenna via the protruding connection terminal section.

* * * * *